(No Model.)
J. B. WALLACE.
REGISTERING APPARATUS FOR GAS METERS.
No. 438,208. Patented Oct. 14, 1890.
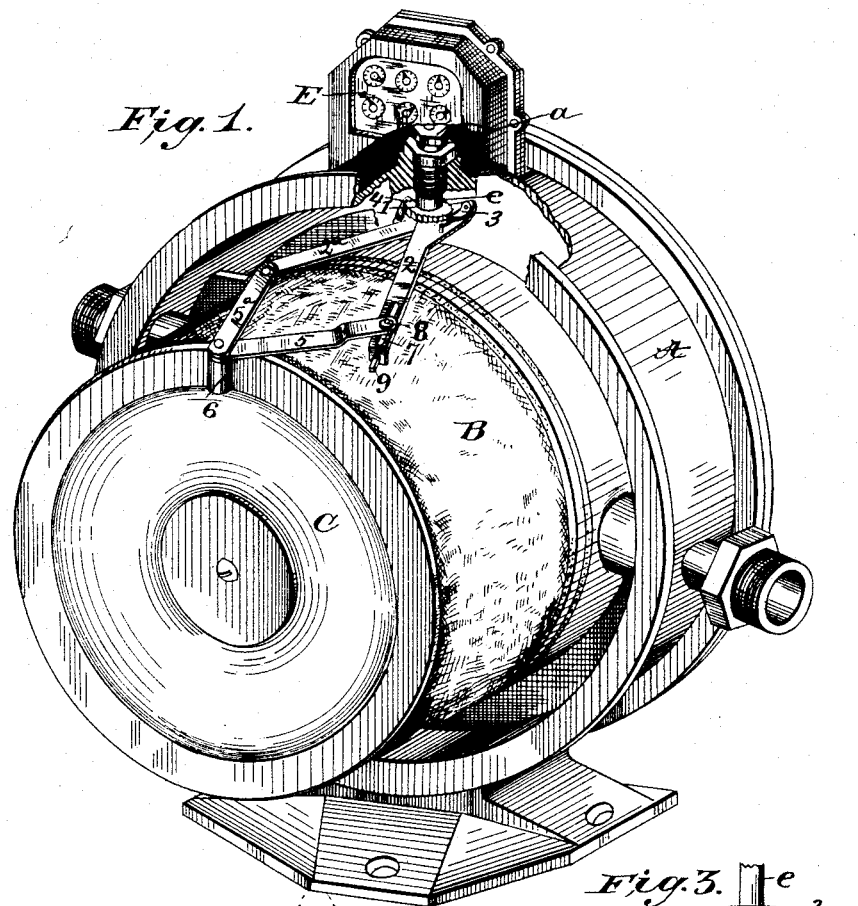
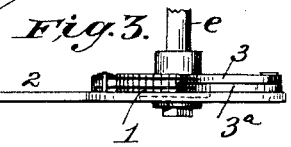
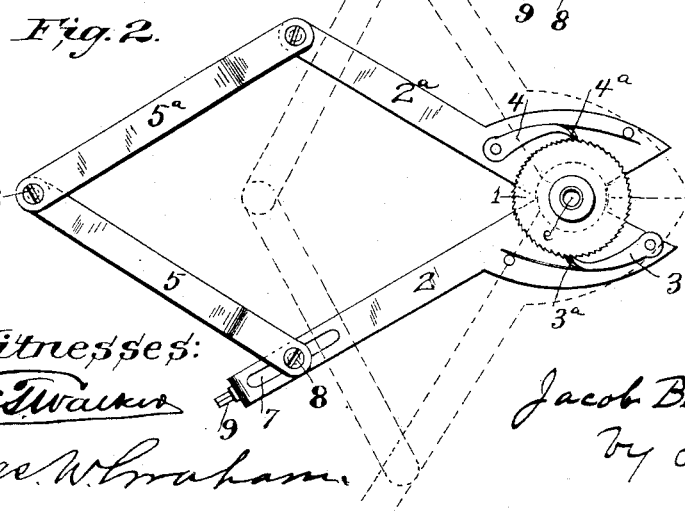
Witnesses:
E. T. Walker
Jas. W. Graham
Inventor:
Jacob Bennett Wallace
by J. W. Ritter Jr
Atty.
THE NORRIS PETERS CO., PHOTO-LITHO., WASHINGTON, D. C.

UNITED STATES PATENT OFFICE.

JACOB BENNETT WALLACE, OF BEAVER FALLS, PENNSYLVANIA, ASSIGNOR TO THE METRIC METAL COMPANY, OF SAME PLACE.

REGISTERING APPARATUS FOR GAS-METERS.

SPECIFICATION forming part of Letters Patent No. 438,208, dated October 14, 1890.

Application filed April 19, 1890. Serial No. 348,637. (No model.)

*To all whom it may concern:*

Be it known that I, JACOB BENNETT WALLACE, a citizen of the United States, residing at Beaver Falls, in the county of Beaver, State of Pennsylvania, have invented certain new and useful Improvements in Registering Apparatus for Meters; and I hereby declare the following to be a full, clear, and exact description of the same, reference being had to the accompanying drawings, wherein—

Figure 1 is a top perspective view of a meter, a portion of the case or shell removed to disclose the registering devices embodying my invention, showing their connection with the bellows. Fig. 2 is a detached enlarged detail view of the devices embodying my invention, the dotted line indicating their mode of operation. Fig. 3 is a detail side elevation of the adjusting-screw, &c.

Like symbols refer to like parts wherever they occur.

My invention relates to means employed for actuating the registering apparatus used in conjunction with meters, and while of utility for coupling the measuring and registering mechanism of meters in general has been especially devised for that class usually termed "dry gas-meters." I have chosen for purposes of illustration a meter wherein the measurement is effected by the reciprocation of a piston and bellows inclosed in a shell or case, and which utilizes the entire space within the shell, receiving and discharging on both sides of the piston, as in the Culmer patents, Nos. 398,707 and 398,708, of February 26, 1889, and No. 409,275, of August 20, 1889; but I do not intend to limit my invention to use with such meters, as those skilled in the art can easily apply it to other forms of meters.

The main feature of my invention embraces the combination, with the piston, diaphragm, or other moving part of the meter, and with the ratchet-wheel of the registering mechanism, of interposed double pawl, radially-arranged pawl-levers having pawls which engage with the ratchet-wheel, said pawls reversely arranged on the different levers, and links which connect said radial pawl-levers with a moving part of the meter.

There are other minor features of invention, all of which will hereinafter more fully appear.

I will now proceed to describe my invention more fully, so that others skilled in the art to which it appertains may apply the same.

In the drawings, A indicates the shell or case of a meter; B, the bellows-ring for the attachment of the bellows; and C the piston or bellows head, which latter in the present instance is the movable part of the meter, to which my devices are attached and from which movement is communicated to the registering devices.

E indicates the registering mechanism of any approved form, supported upon the shell A and connected with the devices embodying my invention by a shaft $e$, which projects through the shell or case A and is surrounded by a stuffing-box $a$.

1 indicates a fine-toothed ratchet-wheel, which is attached to the shaft $e$ within the shell or case A of the meter, said wheel being sufficiently thick to accommodate two pawls arranged side by side, and 2 $2^a$ indicate a pair of radially-arranged pawl-levers, each pivoted at one end on the shaft $e$, or having a common center with the fine-toothed ratchet-wheel 1. Said radial pawl-levers are preferably of an arc shape or expanded at the end adjacent to the ratchet-wheel 1 to afford attachment for the spring-pawls which coact with the ratchet.

3 $3^a$ and 4 $4^a$ indicate the two sets of spring-pawls which engage the ratchet-wheels. On each radial lever is one set of spring-pawls, the two pawls constituting a set being arranged on the same pivot side by side or in the same direction, one pawl of the set being sufficiently longer than the other to cause the pawls to engage successive teeth of the ratchet-wheel and so that they shall disengage alternately, and thus prevent any slipping or accidental skipping of the ratchet-wheel likely to occur with a wheel having very fine ratchet-teeth. Each set of pawls I term a "double pawl" or "twin pawls." The two sets 3 $3^a$ and 4 $4^a$ are reversely placed on their respective radial pawl-levers 2 $2^a$, so as to impart a substantially continuous motion to ratchet-wheel 1 and shaft $e$ when the radial pawl-levers are vibrated. The distant end of each of said pawl-levers 2 2ª is connected by a link or pivoted lever 5 5ª with a pivot point or post 6 in some movable part of the meter—in the present instance with the piston or bellows-head C. The pivotal connection between at least one of said radial pawl-levers and the link or lever which connects it with the post 6 or other movable part of the meter should be adjustable, so as to regulate the extent of vibration of the radial pawl-levers and rate of rotation of the ratchet-wheel, and for this purpose I prefer the construction shown in the drawings—that is to say, one of the radial pawl-levers is slotted longitudinally at its distant end, as at 7, and in said slot is arranged a sliding pivot-block 8, to which the link or lever 5 is attached, and an adjusting-screw 9, which passes through the end of the radial pawl-lever, engages in a split nut on said sliding pivot-block 8, (see Fig. 3,) which binds on the screw 9, holding it fast at any position. By this construction a very nice adjustment and regulation of the registering mechanism can be obtained, and the adjustment can be made from the outside of the meter while the meter is being tested.

The construction of the devices being substantially as specified, they will operate as follows: When the bellows of the meter expands or fills, the radial pawl-levers will be caused to approach each other and the twin pawls of one lever will engage with and rotate the ratchet-wheel 1, while the twin pawls on the other lever will travel over the ratchet-teeth with a step-by-step motion, and when the bellows contracts or collapses the second set of twin pawls will engage with and continue the rotation of the ratchet-wheel, while the first pair of twin pawls will in turn travel over the ratchet-teeth with a step-by-step motion, so that a substantially continuous rotation of the ratchet-wheel is effected without danger of lost motion and with accuracy in the operation of the register.

Having thus described the nature and operation of my invention, what I claim, and desire to secure by Letters Patent, is—

1. The combination, with a meter and its registering mechanism, of a ratchet-wheel, radially-arranged pawl-levers, each having a pawl which engages with the ratchet-wheel, said pawls reversely arranged on the different levers, and links or levers which connect said radial pawl-levers with a moving part of the meter, substantially as and for the purposes specified.

2. The combination, with a meter and its registering mechanism, of a fine-toothed ratchet-wheel, radial pawl-levers, each of said pawl-levers provided with twin pawls and said pawls reversely arranged on the different pawl-levers, and links or levers which connect the radial pawl-levers with a moving part of the meter, substantially as and for the purposes specified.

3. The combination, with a meter and its registering mechanism, of a ratchet-wheel, a pawl-lever provided with a pawl which engages the ratchet-wheel, a link or lever which connects the pawl-lever with a moving part of the meter, a sliding pivot-block which connects the pawl-lever and link, said sliding block having a nut, and an adjusting-screw which passes through the end of the pawl-lever and engages in the nut of the sliding pivot-block, substantially as and for the purposes specified.

4. The combination, with a meter and its registering mechanism, of a ratchet-wheel, a pawl-lever having a pawl which engages the ratchet-wheel, a link or lever which connects the pawl-lever with a moving part of the meter, a sliding pivot-block which connects the pawl-lever and link, said sliding block provided with a split nut, and an adjusting-screw having a bearing on the pawl-lever and which engages in the split nut of the sliding pivot-block, substantially as and for the purposes specified.

In testimony whereof I affix my signature, in presence of two witnesses, this 18th day of April, 1890.

JACOB BENNETT WALLACE.

Witnesses:
F. L. GALLAGHER,
JUDSON BRENNER.